US006757472B2

(12) United States Patent
Diemeer

(10) Patent No.: US 6,757,472 B2
(45) Date of Patent: Jun. 29, 2004

(54) OPTICAL WAVEPLATE AND AN OPTICAL DEVICE USING THE WAVEPLATE

(75) Inventor: Mart Diemeer, Hummelo (NL)

(73) Assignee: JDS Uniphase, Inc. (CA)

( * ) Notice: Subject to any disclaimer, the term of this patent is extended or adjusted under 35 U.S.C. 154(b) by 124 days.

(21) Appl. No.: 09/924,578

(22) Filed: Aug. 9, 2001

(65) Prior Publication Data

US 2002/0044744 A1 Apr. 18, 2002

(30) Foreign Application Priority Data

Aug. 15, 2000 (CA) ............................................. 2315997

(51) Int. Cl.[7] ............................................... G02B 6/00
(52) U.S. Cl. ...................................................... 385/141
(58) Field of Search ................................ 385/141, 142, 385/143, 37

(56) References Cited

U.S. PATENT DOCUMENTS

| 4,756,953 | A | | 7/1988 | Utsumi ........................ 428/220 |
| 5,901,259 | A | | 5/1999 | Ando et al. .................... 385/16 |
| 5,903,392 | A | * | 5/1999 | Kojima et al. ............... 359/599 |

OTHER PUBLICATIONS

European Search Report and Annex, Number EP 01 30 6797 Jan. 18, 2002.

* cited by examiner

*Primary Examiner*—Javaid H. Nasri
(74) *Attorney, Agent, or Firm*—Hall, Priddy, Myers & Vande Sande

(57) ABSTRACT

Optical waveplates made of polyethylene naphthalate (PEN) exhibit good optical properties comparable to or exceeding the respective properties of prior art waveplates made of polyimides (PI). PEN waveplates are a technically and commercially reasonable alternative to PI waveplates.

6 Claims, 3 Drawing Sheets

— AT 1550 nm, MODE FIELD RADIUS=3.7 mu, INDEX=1.5

OPTICAL WAVEPLATE AND AN OPTICAL DEVICE USING THE WAVEPLATE

This application claims the priority of Canadian Patent Application No. 2,315,997 filed Aug. 15, 2000.

FIELD OF THE INVENTION

The present invention relates to optical waveplates useful in optical communication systems and to optical devices using such waveplates.

BACKGROUND OF THE INVENTION

In planar lightwave circuits (PLCs), for example arrayed waveguide gratings (AWGs), polarization dependence is a well known problem. It stems from the fact that the planar waveguides typically exhibit birefringence. The problem is described in detail e.g. in U.S. Pat. No. 5,901,259 issued May 4, 1999 to Ando et al. The specification of the patent is hereby incorporated by reference.

According to the Ando patent, supra, the problem is dealt with by providing an optical waveplate made of polyimide. The waveplate has a specific thickness of 20 µm or smaller. The waveplate is inserted into the optical waveguide circuit so that the waveplate is either perpendicular to or somewhat inclined from the longitudinal direction of the waveguide. The waveguide is typically inserted in the middle of the optical path of the waveguide(s).

The waveplate functions by converting the TE (transverse electric) polarization into TM (transverse magnetic) polarization and vice versa.

SUMMARY OF THE INVENTION

While the waveplates of Ando et al. appear to perform their function as intended, their price at this time is relatively high and there is a need to develop a low-cost alternative. Since there are many amorphous polymers in which large in-plane birefringence can be induced, it is not a trivial task to find a polymer that meets stringent reliability requirements for optical communication purposes.

The present inventor has found that a highly effective waveplate can be obtained from properly processed polyethylene naphthalate (PEN). The waveplate must meet basically the same requirements as the polyimide waveplates of the Ando patent, supra.

The waveplate may preferably be in the form of a film having a thickness in the range of 2 to about 25 µm. The film may be stretched uniaxially or biaxially to control its refractive index and thus the birefringence.

The waveplate may form part of an optical waveguide device such as an arrayed waveguide grating.

DETAILED DESCRIPTION OF THE INVENTION

Polyethylene naphthalate (PEN) has the following chemical formula, somewhat similar to another popular polymer, polyethylene terephthalate:

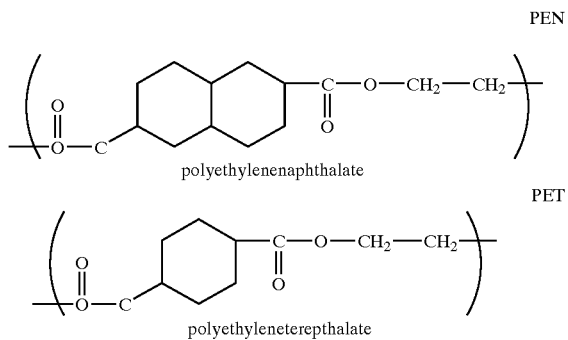

Chemically, both these polymers are polyesters. An attractive property of these polymers is self-supporting thin film forming by means of extrusion. The thin film of PET is well known under the brand name (DuPont) of Mylar. The present work is only concerned with PEN films as its performance appears significantly higher than that of PET.

PEN film is commercially produced by Teijin (Japan) under the trade name Teonex and DuPont (USA) under the trademark Kaladex. The basic properties of the polymer film are as follows:

high in-plane birefringence (up to 0.3, obtained or promoted by stretching of a PEN sheet)

relatively high glass transition temperature, $T_g$, 122° C.

high solvent resistivity relatively high mechanical strength, sufficient to enable the processing of thin sheets of the polymer.

high extinction of an optical signal in specific conditions.

To obtain a waveplate, the PEN material is extruded into a film. The extrusion process is followed by two-dimensional (biaxial) stretching, to bring the thickness to the desired value and to enhance the in-plane mechanical properties. To bring the in-plane birefringence to the desired level, an additional one-dimensional (uniaxial) stretching (post stretching) is applied.

To rotate the polarization of a light beam by 90 degrees, half-wave retardation is needed. Hence, the product of thickness and birefringence of the retarder element must be half the wavelength used (usually, but not exclusively, around 1550 nm).

Figure 2:
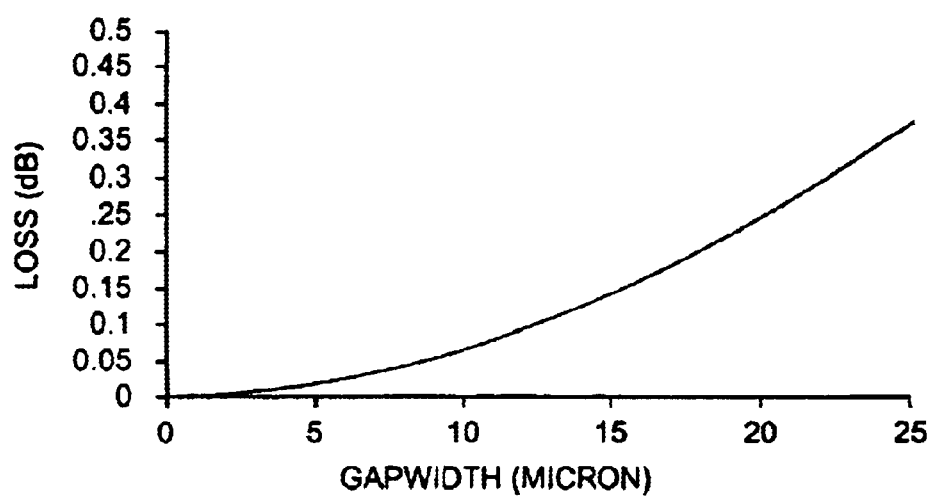
FIG. 2 is a diagram illustrating the loss as a function of gap width at 1550 nm.

To keep the optical losses by diffraction through the gap at a low level, the thickness of the waveplate should be smaller than about 20 microns, as seen in FIG. 2 representing the loss as a function of gap width at 1550 nm. It follows that the birefringence of the waveplate material should be relatively large (min. approx. 0.04) to produce the retardation half wave.

The half wave retardation for 1550 nm (1.55 µm) is 0.775 microns. It is possible to induce a birefringence up to about 0.35 in the PEN film. A realistic minimum thickness of the waveplate is therefore 0.775/0.35=2.2 µm. The maximum thickness of the waveplate is determined by acceptable diffraction losses. A plate 20 µm thick yields 0.25 dB loss (FIG. 1) while a 25 µm plate yields as much as 0.4 dB.

Figure 3:
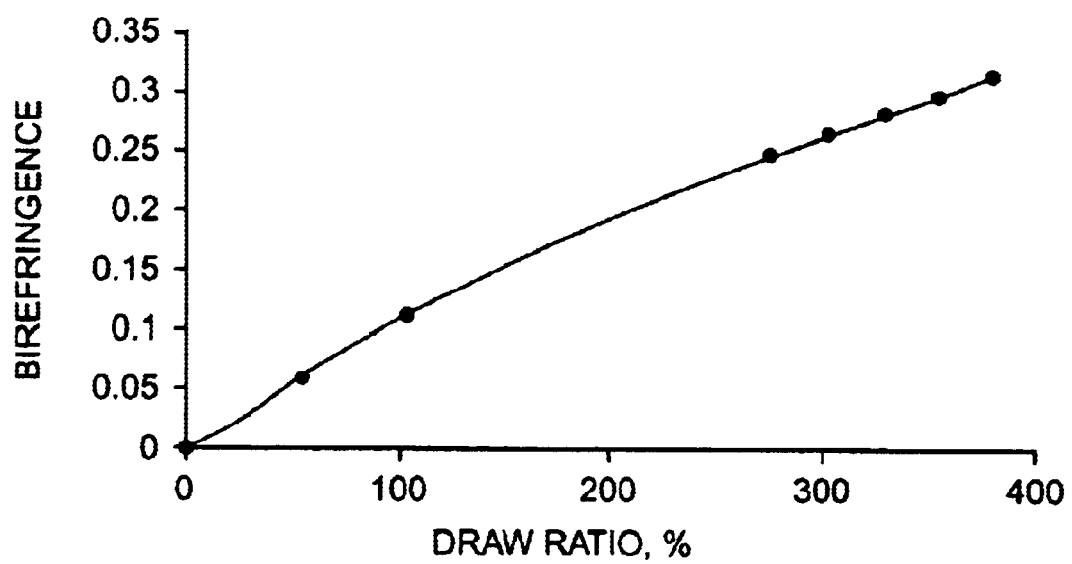
FIG. 3 illustrates the effect of draw ratio on the birefringence of PEN film.

Uniaxially stretched PEN foil exhibits in-plane birefringence due to the draw ratio. FIG. 3 illustrates this relationship. It can be seen that a moderate draw ratio of, say, 50% already results in a birefringence of 0.05.

Commercially available PEN foils are always stretched in two directions that are perpendicular to each other as the stretching brings about an improvement of mechanical properties in the direction of stretching of the foil. Biaxially stretched PEN foil as obtained from the manufacturer (Teijin) exhibits birefringence due to an unbalanced draw ratio.

Commercially available Teijin PEN films (foil) may require a small amount of post-stretching to arrive at a birefringence that produces half-wave retardation. The need for the post-stretching and the amount thereof should be assessed individually on an as-needed basis.

In a specific example, a waveplate material was obtained by post-stretching samples of a 16 μm Teijin Q51 film. A small stretching apparatus was built which consisted of a fixed clamp and a movable clamp on a rail. The foil samples were 25 mm in width and of various length up to 100 mm. The apparatus was placed in a tubular hot wall oven to stretch the foil at approx. the $T_g$ temperature by pulling at the movable clamp.

The draw ratios were from 2.5% to more than 10%. The samples after drawing were evaluated using visible light between crossed polarizers.

The color of the central part of the sample changed as a result of the drawing as follows, starting from the original second order green:

| Draw ratio (%) | Color |
| --- | --- |
| 2.5 | second order yellow/orange |
| 3.75 | second order pale red |
| 5 | second order dark red |
| 7.5 | third order blue-green |
| >10 | high-order pink |

When passed through parallel polarizers with the waveplate in between, an optical signal undergoes an extinction that is very high when the waveplate retardation is exactly half wave, since the light polarized by the first polarizer is rotated by precisely 90° by the waveplate and is blocked by the second polarizer that is parallel to the first polarizer. Therefore, extinction induced by the halfwave plate between parallel polarizers is a way to assess the quality of the waveplate.

Figure 4:
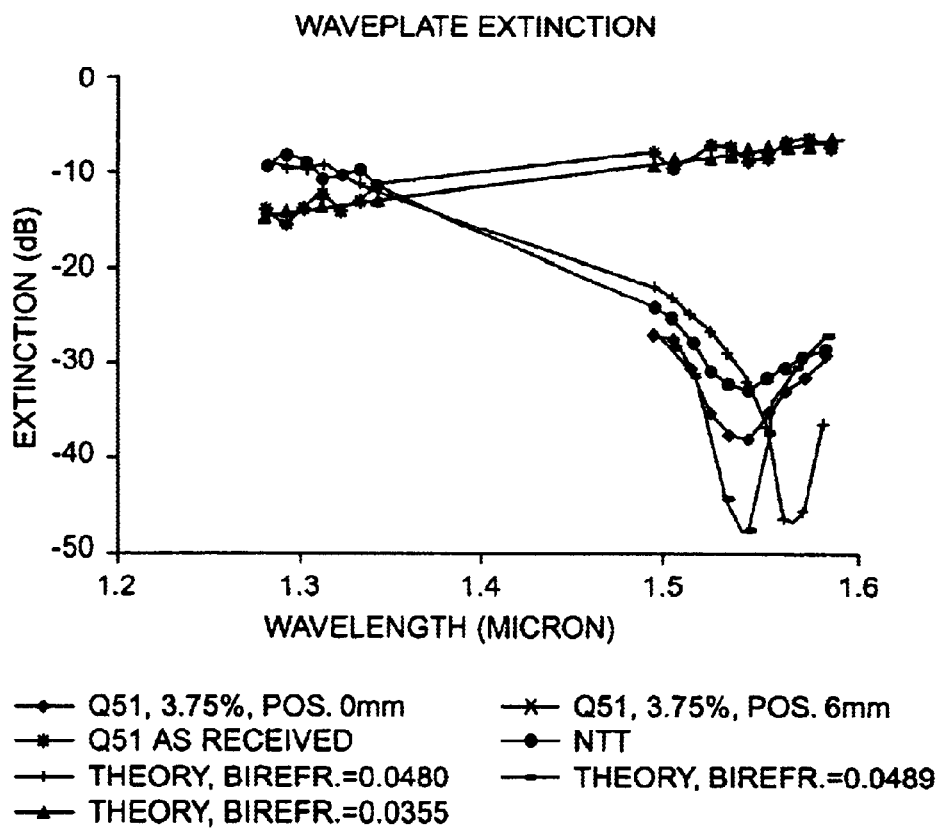
FIG. 4 is a diagram showing extinction properties of a PEN waveplate.

The results of the PEN waveplates exceeded in certain respect the performance of corresponding NTT (polyimide) waveplates. For example, the 3.75% stretched Q51 16 μm foil showed an extinction <−30 dB over the entire C band (1525–1565 nm) as shown in FIG. 4.

Figure 1:
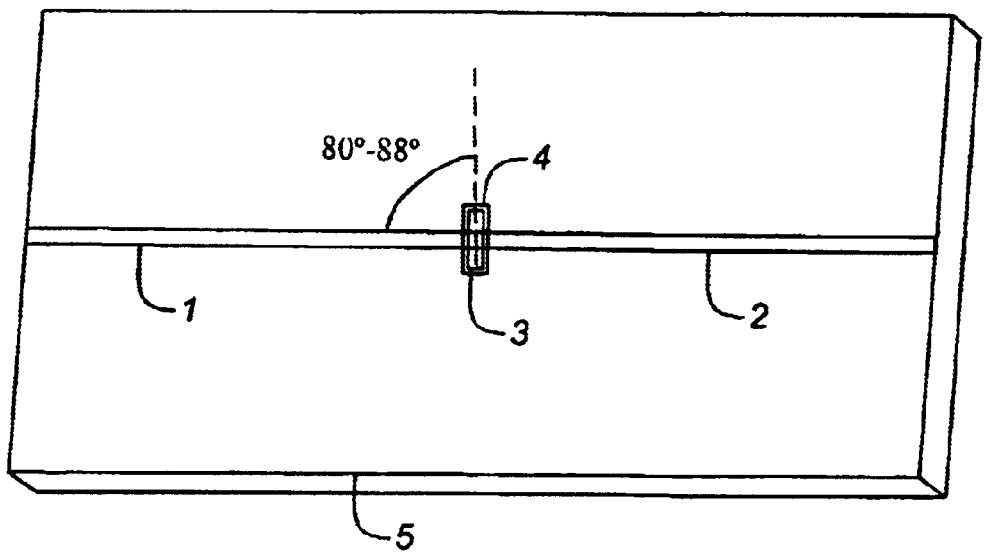
FIG. 1 illustrates the use of a PEN waveplate of the present invention.

In a specific use of the invention, as illustrated in FIG. 1, a PEN waveplate 3 of the invention, of the size approximately 2 mm×5 mm and thickness of 16 μm was installed in a 20 μm wide slot 4 formed in the middle of an optical path of a single silica waveguide 1, 2 having a cross-sectional width of 10×10 μm made in a silicon substrate 5. The waveplate was installed at an angle of about 85° to the optical axis of the waveguide to avoid back reflection. This angle can be selected in a range approximately 80–88°.

Figure 5:
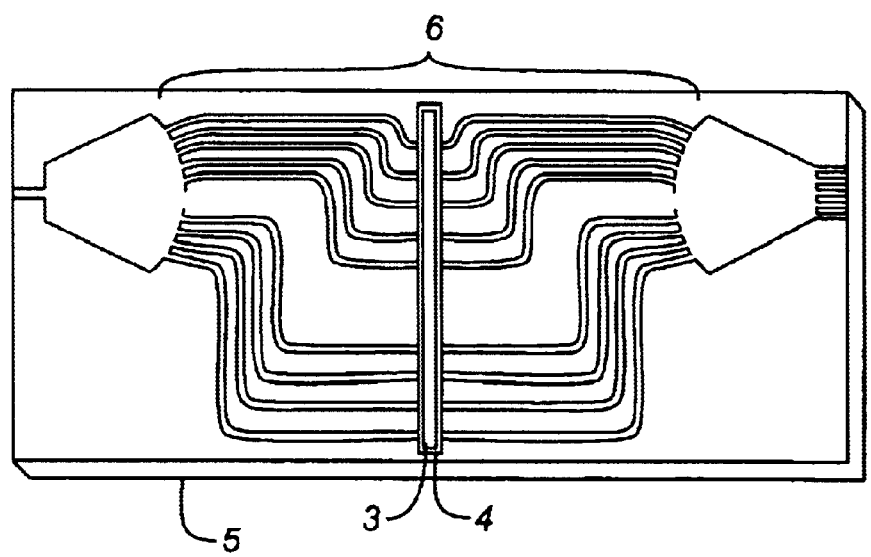
FIG. 5 illustrates the use of a PEN waveplate in an arrayed waveguide grating.

Alternatively, as shown in FIG. 5, the waveplate can be installed in an arrayed waveguide grating (AWG), where the waveplate 3 is placed in a groove 4 cut across waveguides 6 made in a silicon substrate 5.

Comparative tests were conducted of PEN HWPs with polyimide HWPs for 20 various chips. The chips used had ultra-high PDL and PDλ, and both the PEN and Polyimide HWPs showed a significant reduction of both respectively. These results support the conclusion that the PEN HWPs are a low-cost alternative to the polyimide HWPs without sacrificing optical performance.

The results are displayed in the table:

|  | BEFORE HWP | | AFTER HWP | | | |
| --- | --- | --- | --- | --- | --- | --- |
| Device | Ave PDL all chs Nortel ±100(pm) BW | Ave PDLambda all chs Nortel 3dBGeneral (pm) | Ave PDL all chs Act. Center ±100(pm) BW | Ave PDLambda all chs 3dBGeneral (pm) | DIFF (B-A) PDL Diff. | DIFF (B-A) PDLambda Diff. |
| IN 22 Pigtailed | | | | | | |
| E 84 | 0.39 | 19.06 | 0.18 | 1.08 | 0.21 | 17.98 |
| E 111 | 0.24 | 18.07 | 0.25 | 16.64 | −0.01 | 1.43 |
| E 349_8 | 0.50 | 22.31 | 0.34 | 3.49 | 0.16 | 18.82 |
| E 349_12 | 0.41 | 16.16 | 0.48 | 33.22 | −0.07 | −17.06 |
| E 349_16 | 0.26 | 5.72 | 0.21 | 8.67 | 0.04 | −2.94 |
| Average | 0.36 | 16.26 | 0.30 | 12.62 | 0.07 | 3.64 |
| IN22 Screened | | | | | | |
| E 40 UV | no | data | 0.51 | 17.58 | | |
| E 68 UV | 0.40 | 13.06 | 0.17 | 4.15 | 0.23 | 8.91 |
| E 81 UV | no | data | 0.31 | 12.64 | | |
| E 101 UV | no | data | 0.61 | 38.97 | | |
| E 103 UV | 0.21 | 97.35 | 0.89 | 22.05 | −0.68 | 75.30 |
| E 176 UV | no | data | 0.74 | 17.85 | | |
| E 39 | no | data | 0.48 | 30.84 | | |
| E 82 | no | data | 0.51 | 19.10 | | |
| E 97 | no | data | 0.56 | 31.23 | | |
| E 100 | no | data | 0.34 | 1.66 | | |
| E 104 | no | data | 0.38 | 21.14 | | |
| E 113 | no | data | 0.37 | 11.35 | | |
| E 177 | no | data | 0.45 | 6.26 | | |
| Average | | | 0.49 | 18.06 | | |

-continued

| Device | Ave PDL all chs Act. Center ±100(pm) BW | Ave PDLambda all chs 3dBGeneral (pm) | Ave PDL all chs Act. Center ±100(pm) BW | Ave PDLambda all chs 3dBGeneral (pm) | Ave PDL all chs Act. Center ±100(pm) BW | Ave PDLambda all chs 3dBGeneral (pm) |
|---|---|---|---|---|---|---|
| IN22 Screened | | | | | | |
| E 417 | 0.22 | 3.45 | 0.80 | 2.32 | −0.58 | 1.13 |
| E 420 | 0.31 | 3.28 | 0.19 | 6.86 | 0.12 | −3.58 |
| E 422 | 0.46 | 11.56 | 0.27 | 6.76 | 0.19 | 4.80 |
| E 424 | 0.40 | 2.46 | 0.54 | 5.37 | −0.14 | −2.91 |
| E 426 | 0.37 | 4.81 | 0.26 | 3.78 | 0.10 | 1.03 |
| E 430 | 0.32 | 3.32 | 0.46 | 5.16 | −0.15 | −1.84 |
| Average | 0.35 | 4.81 | 0.42 | 5.04 | −0.08 | −0.23 |

It can be seen that the waveplates of the invention are quite effective in alleviating the problem of polarization dependence of planar lightwave circuits such as AWGs.

An advantage of the PEN waveplates over the PI waveplates is their uniformity over large area owing to the large size extrusion process of PEN films. The PI films, described in the Ando US patent, supra, are made by a spin coating and release Silicon onto wafers and yield much smaller size waveplates. It is conceivable to provide a wafer sized PEN waveplate, with a length approximately 20 mm thus covering a large number of waveguide channels across the width of an optical wafer. In this manner, a large number of components can be equipped with a waveplate using a slot that runs across the entire wafer. This of course is a cost-effective measure, both from the material and labor standpoint.

In summary, PEN waveplates represent a technically and commercially viable solution to the polarization dependence problem of PLCs.

What is claimed is:

1. An optical waveplate comprising a film of polyethylene naphthalate axially stretched in at least one axial direction to form a waveplate having a thickness in a range of 2 μm to 25 μm in an amount sufficient to create birefringence such that the waveplate has a predetermined retardance for light passing through it.

2. An optical waveplate as defined in claim 1, wherein the film of polyethylene naphthalate is coupled to an optical waveguide to transmit light therebetween.

3. An optical device comprising:
at least an optical waveguide having two sections, and
a polyethylene naphthalate optical waveplate film having a thickness in the range of 2 μm to about 25 μm wherein said film is axially stretched in at least one axial direction in an amount sufficient to create a birefringence and which is optically coupled between the two sections of the waveguide to transmit a light signal between said two sections of the waveguide.

4. The optical device of claim 3 wherein the waveguide defines an optical axis and the waveplate is disposed at an angle in the range 80–88° to the optical axis of the waveguide.

5. The optical device of claim 3 wherein the waveguide is an arrayed waveguide grating.

6. An optical device comprising
a wafer,
a plurality of waveguides extending across the wafer,
a slot extending across the waveguides, and
a polyethylene naphthalate optical waveplate comprised of a film having a thickness in the range of 2 μm to 25 μm which is axially stretched in at least one axial direction in an amount sufficient to create birefringence, said waveplate being disposed in the slot and extending therealong so as to optically modify optical signals passing through the waveguides.

* * * * *